United States Patent
Shundo et al.

(12)

(10) Patent No.: US 9,567,070 B2
(45) Date of Patent: Feb. 14, 2017

(54) TILTROTOR CONTROL SYSTEM WITH TWO RISE/FALL ACTUATORS

(71) Applicant: Bell Helicopter Textron Inc., Fort Worth, TX (US)

(72) Inventors: Ken Shundo, Keller, TX (US); Carlos A. Fenny, Arlington, TX (US); Frank B. Stamps, Colleyville, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 1123 days.

(21) Appl. No.: 13/835,705

(22) Filed: Mar. 15, 2013

(65) Prior Publication Data

US 2014/0271204 A1 Sep. 18, 2014

(51) Int. Cl.
| | |
|---|---|
| *B64C 27/10* | (2006.01) |
| *B64C 29/00* | (2006.01) |
| *B64C 11/32* | (2006.01) |
| *B64C 27/605* | (2006.01) |

(52) U.S. Cl.
CPC ........... *B64C 29/0033* (2013.01); *B64C 11/32* (2013.01); *B64C 27/605* (2013.01)

(58) Field of Classification Search
CPC ........ B64C 27/10; B64C 27/605; B64C 27/50; B64C 11/06
USPC ........................................... 416/24, 148, 134
See application file for complete search history.

(56) References Cited

U.S. PATENT DOCUMENTS

| | | | |
|---|---|---|---|
| 2,689,616 A | 9/1954 | Nagler | |
| 3,358,565 A * | 12/1967 | Townsend | B64C 13/24 244/194 |
| 3,637,322 A * | 1/1972 | Kannamuller | D06M 11/82 416/102 |
| 3,807,896 A * | 4/1974 | Johnson | B64C 27/35 416/102 |

(Continued)

FOREIGN PATENT DOCUMENTS

| | | |
|---|---|---|
| DE | 102010025718 | 1/2012 |
| EP | 2105379 A2 | 9/2009 |

(Continued)

OTHER PUBLICATIONS

Communication Pursuant to Article 94(3) EPC issued in European Application No. 14153802.5 on Sep. 2, 2014; 7 pages.

(Continued)

*Primary Examiner* — Thomas Denion
*Assistant Examiner* — Shafiq Mian
(74) *Attorney, Agent, or Firm* — Fish & Richardson P.C.

(57) ABSTRACT

A rotor system for rotor aircraft comprises a rotor hub comprising a plurality of rotor blades, a rotatable rotor mast coupled to the rotor hub, a swashplate assembly comprising a non-rotating ring engaged with a rotatable ring, a plurality of pitch links mechanically coupling the rotatable ring to the plurality of rotor blades, and a swashplate actuator system. The rotatable ring is configured to rotate with the rotor mast, and the non-rotating ring is configured to engage and guide the rotatable ring. The pitch links are configured to control the pitch angle of each rotor blade. The swashplate actuator system consists of: a first actuator and a second actuator, where the first actuator and the second actuator are mechanically coupled to a stationary surface and the non-rotating ring.

22 Claims, 6 Drawing Sheets

(56) References Cited

U.S. PATENT DOCUMENTS

| | | | | |
|---|---|---|---|---|
| 3,930,625 | A * | 1/1976 | Krivka | B64C 27/16 244/17.21 |
| 7,644,887 | B2 * | 1/2010 | Johnson | B64C 27/10 244/17.19 |
| 2002/0134883 | A1 * | 9/2002 | Stamps | B64C 27/08 244/7 R |
| 2005/0147495 | A1 * | 7/2005 | Bittner | B64C 27/32 416/131 |
| 2005/0196275 | A1 * | 9/2005 | Carson | F03B 1/00 415/211.2 |
| 2007/0105475 | A1 * | 5/2007 | Gotou | A63H 27/12 446/37 |
| 2007/0128037 | A1 * | 6/2007 | Schmaling | B64C 27/605 416/134 A |
| 2008/0044283 | A1 * | 2/2008 | Schmaling | B64C 27/51 416/134 A |
| 2008/0253891 | A1 | 10/2008 | Cabrera et al. | |
| 2008/0279685 | A1 * | 11/2008 | Kessler | B64C 27/001 416/31 |
| 2009/0242691 | A1 * | 10/2009 | Wittmer | B64C 27/68 244/17.13 |
| 2010/0123045 | A1 * | 5/2010 | Grieser | B63H 25/10 244/178 |
| 2011/0112806 | A1 * | 5/2011 | Kisor | B64C 27/04 703/2 |
| 2013/0341458 | A1 * | 12/2013 | Sutton | B64C 27/54 244/17.25 |
| 2014/0234102 | A1 * | 8/2014 | Fenny | B64C 27/72 416/1 |

FOREIGN PATENT DOCUMENTS

| | | |
|---|---|---|
| EP | 2105379 A3 | 9/2009 |
| KR | 2010138017 | 12/2010 |
| KR | 20100138017 | 12/2010 |
| WO | 2012/161680 | 11/2012 |

OTHER PUBLICATIONS

European Search Report issued in European Application No. 14153802.5 on Aug. 21, 2014; 4 pages.

* cited by examiner

TILTROTOR CONTROL SYSTEM WITH TWO RISE/FALL ACTUATORS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A tilt rotor aircraft can have wing mounted rotatable nacelles that can be selectively rotated between a helicopter mode and an airplane mode. In the helicopter mode, the nacelles can be rotated to an approximate vertical position so that the tilt rotor aircraft can take off, land, and hover similar to a conventional helicopter. In the airplane mode, the nacelles can be rotated to an approximate horizontal position so that the tilt rotor aircraft can fly similar to a fixed wing aircraft.

SUMMARY

In an embodiment, a rotor system for rotor aircraft comprises a rotor hub comprising a plurality of rotor blades, a rotatable rotor mast coupled to the rotor hub, a swashplate assembly comprising a non-rotating ring engaged with a rotatable ring, a plurality of pitch links mechanically coupling the rotatable ring to the plurality of rotor blades, and a swashplate actuator system. The rotatable ring is configured to rotate with the rotor mast, and the non-rotating ring is configured to engage and guide the rotatable ring. The pitch links are configured to control the pitch angle of each rotor blade. The swashplate actuator system consists of: a first actuator and a second actuator, where the first actuator and the second actuator are mechanically coupled to a stationary surface and the non-rotating ring.

In an embodiment, a rotor system for rotor aircraft comprises a rotor hub comprising a plurality of rotor blades, a rotatable rotor mast coupled to the rotor hub, a swashplate assembly comprising a non-rotating ring engaged with a rotatable ring, a plurality of pitch links mechanically coupling the rotatable ring to the plurality of rotor blades, and a swashplate actuator system. The non-rotating ring is configured to engage and guide the rotatable ring, and the pitch links are configured to control the pitch angle of each rotor blade. The swashplate actuator system consists of a first actuator, a second actuator, and a trim actuator. The first actuator and the second actuator are mechanically coupled to a housing and the non-rotating ring, and the trim actuator is mechanically coupled to the non-rotating ring and a stationary surface.

In an embodiment, a swashplate assembly for use with a rotor aircraft comprises a non-rotating ring engaged with a rotatable ring, and a swashplate actuator system. The rotatable ring is configured to rotate with a rotor mast, and the non-rotating ring is configured to engage and guide the rotatable ring. The swashplate actuator system comprises a first actuator and a second actuator engaged with the non-rotating ring. The first actuator and the second actuator are configured to tilt the non-rotating ring about a single axis of rotation, and the first actuator and the second actuator are further configured to translate the non-rotating ring along the axis of the rotor mast at a fixed angle without any additional inputs.

These and other features will be more clearly understood from the following detailed description taken in conjunction with the accompanying drawings and claims.

BRIEF DESCRIPTION OF THE DRAWINGS

For a more complete understanding of the present disclosure and the advantages thereof, reference is now made to the following brief description, taken in connection with the accompanying drawings and detailed description.

DETAILED DESCRIPTION OF THE EMBODIMENTS

Figure 1:
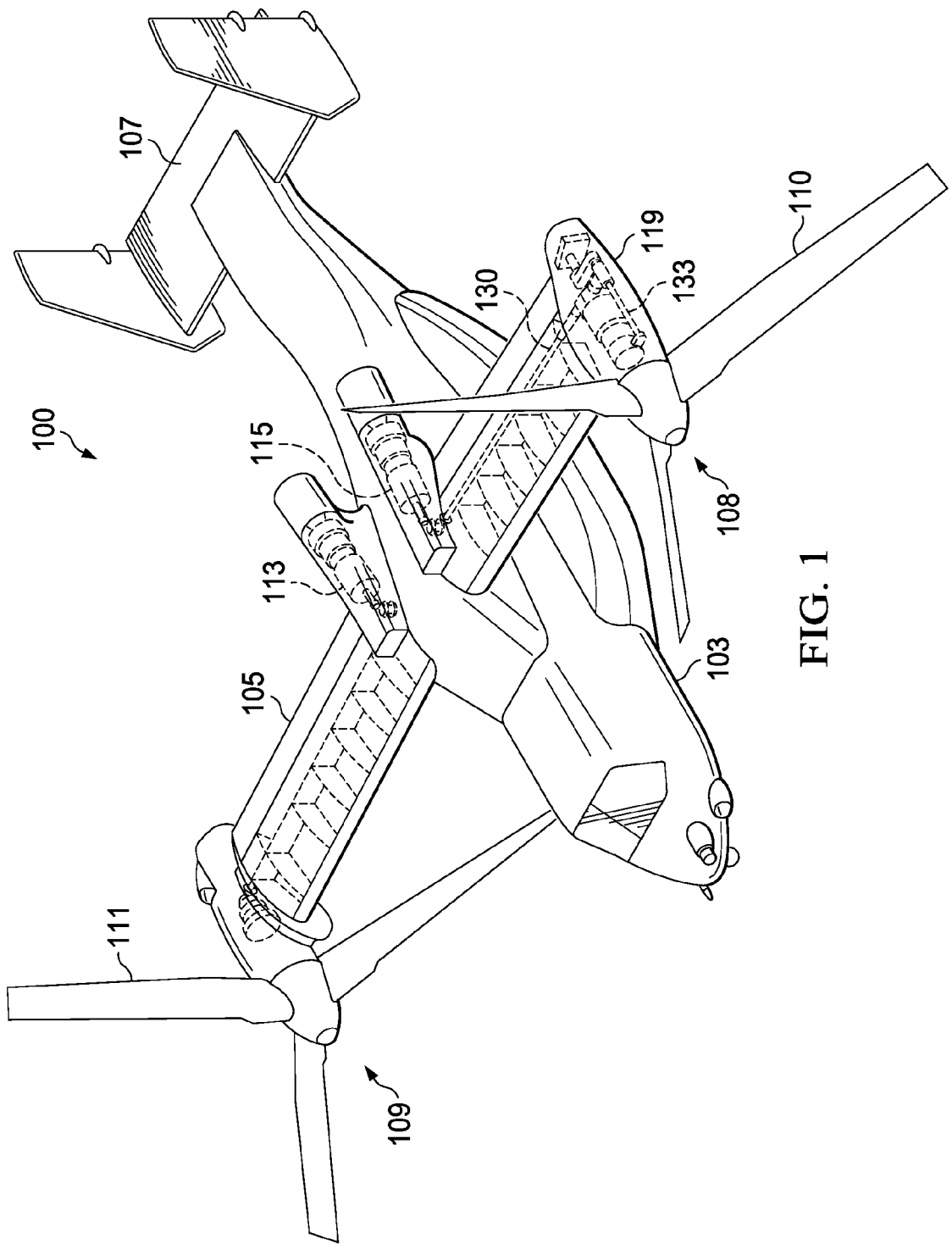
FIG. 1 is a perspective, partial cut-away view of a tilt rotor aircraft in an airplane mode according to an embodiment.

In the drawings and description that follow, like parts are typically marked throughout the specification and drawings with the same reference numerals, respectively. In addition, similar reference numerals may refer to similar components in different embodiments disclosed herein. The drawing figures are not necessarily to scale. Certain features of the invention may be shown exaggerated in scale or in somewhat schematic form and some details of conventional elements may not be shown in the interest of clarity and conciseness. The present invention is susceptible to embodiments of different forms. Specific embodiments are described in detail and are shown in the drawings, with the understanding that the present disclosure is not intended to limit the invention to the embodiments illustrated and described herein. It is to be fully recognized that the different teachings of the embodiments discussed herein may be employed separately or in any suitable combination to produce desired results. It should also be recognized that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

Unless otherwise specified, use of the terms "connect," "engage," "couple," "attach," or any other like term describing an interaction between elements is not meant to limit the interaction to direct interaction between the elements and may also include indirect interaction between the elements described. In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

The system of the present application includes a rotor system for an aircraft. The rotor system generally includes a plurality of rotor blades coupled to a rotatable rotor mast. The rotor blades can be controlled using a swashplate system that includes a non-rotating ring rotatably engaged with a rotatable ring. The swashplate system can be actuated using an actuation system having only two main actuators. The two actuators would then be used to control forward and aft movement using the rotor blades. An optional trim actuator may be used that is smaller than the main actuators and allow for some amount of lateral trim. The use of only two main actuators may allow the non-rotating ring to be tilted about a single axis of rotation as well as being translated along the axis of the rotor mast at a fixed angle without any additional inputs. The use of the two main actuators may then allow the system to operate while providing a relatively simple system of control and additional space within the rotor-pylon relative to systems having three or more main actuators.

Referring to FIG. 1, a tilt rotor aircraft 100 is illustrated. In an embodiment, a tilt rotor aircraft 100 comprises a fuselage 103, a wing member 105, and a tail member 107. While described as a single wing member 105, it is to be understood that the wing member may be formed from separate components such that two or more wing members are coupled to the fuselage 103 (e.g., each side of the fuselage may comprise a separate wing member). The aircraft 100 may also include a first rotor system 108 and a second rotor system 109. The first rotor system 108 is located on an end portion of a first side of the wing member 105, while the second rotor system 109 is located an end portion of a second side of the wing member 105. The first rotor system 108 and second rotor system 109 are substantially symmetric of each other about the fuselage 103. The first rotor system 108 and the second rotor system 109 each include a plurality of rotor blades 110 and 111 coupled to a rotor hub, respectively. The rotor blades 110, 111 may rotate in opposite directions to cancel the torque associated with the operation of each rotor system 108, 109. The rotor system 108 includes a nacelle 123 that is configured to rotate along with the rotatable rotor system 108 between the vertical and horizontal positions. In the interest of clarity, only the first rotor system 108 will be discussed in detail in the following description. However, it should be understood that the form and function of the second rotor system 109 can be fully understood from the description of the first rotor system 108 described herein.

While FIG. 1 illustrates the rotor systems 108, 109 in the context of a tilt rotor aircraft, it should be understood that the first rotor system 108 and/or the second rotor system 109 can be implemented on other tilt rotor aircraft. For example, an alternative embodiment may include a quad tilt rotor aircraft that has an additional wing member located aft of wing member 105. The additional wing member can have additional rotor systems similar to first rotor system 108 and the second rotor system 109. In some embodiments, the rotor systems 108, 109 can be used with an unmanned version of a tilt rotor aircraft 100. Further, the first rotor system 108 and/or the second rotor system 109 can be integrated into a variety of tilt rotor aircraft configurations. In some embodiments, the rotor systems described herein may be used with a single rotor system aircraft such as a conventional helicopter main and tail rotors.

One or more engines 113, 115 can provide power to the rotor systems 108, 109 as well as other systems within the aircraft 100. A drive path comprising a driveshaft 130 in one or more sections can provide a mechanical connection for power transfer between the engines 113, 115 and the rotor assemblies 108, 109. An interconnect drive shaft may be used to couple each engine 113, 115 and/or the rotor systems 108, 109 to provide a redundant power supply in an engine out condition. The drive path may comprise one or more gearboxes coupled to the driveshaft 130. For example, a prop-rotor gearbox 134 may be coupled to the driveshaft 130, and the prop-rotor gearbox may comprise one or more gears configured to provide power to the rotor system 108 while reducing the rotational speed of the driveshaft 130, which may be operated at or near the speed of the engine, to a speed useful with the rotor hub and rotor blades 110. Various speed reduction gearing may be used and can include one or more helical gearsets, planetary gearsets, or the like.

It should be appreciated that although the engines 113, 115 are shown on the wing member 105, other engine configurations may be used. For example, one or more of the engines 113, 115 can be located in the fuselage 103, on or near the wing member 105 (e.g., at or near the wing tip), as well as being coupled in a fixed relationship to the rotor system 108 (e.g., the entine may selectively rotate with the rotor system 108). While two engines are shown, only a single engine or more than two engines may also be used. It should also be appreciated that even though aircraft 100 is depicted with three rotor blades per rotor system 108, 109, greater or fewer rotor blades can be employed. For example, the rotor assemblies 108, 109 may use four or more rotor blades 110, 111 per rotor system 108, 109, respectively.

A conversion actuator 133 may be used to selectively rotate the rotor system 108 between the vertical position (e.g., the helicopter mode) and the horizontal position (e.g., the airplane mode). The conversion actuator 133 may be coupled to the wing member 105 at a first point and the rotor system 108 at a second point, thereby allowing the rotor system 108 to be selectively rotated relative to the wing member 105. In an embodiment, the conversion actuator 133 may comprise any of a variety of configurations with the exact actuator type being implementation specific. In an embodiment, the conversion actuator 133 may include, but is not limited to, a linear actuator, a rotary actuator, a hydraulic actuator, or the like. Multiple actuators may be provided to serve as redundant conversion actuation systems in the event that a first conversion actuator 133 is damaged, destroyed, or fails to operate as designed.

While the rotor systems 108, 109 are illustrated as being located at the wing tip, it should be appreciated that the wing tip portion of wing member 105 can be lengthened to customize an aspect ratio of wing member 105 in accordance with implementation specific requirements (e.g., aerodynamic lift requirements). As such, it should be understood that even though the rotor system 108 is illustrated approximately abutting the wing tip portion of wing member 105, in some embodiments, the rotor system 108 may include the wing tip portion extending beyond the rotor system 108.

Figure 2:
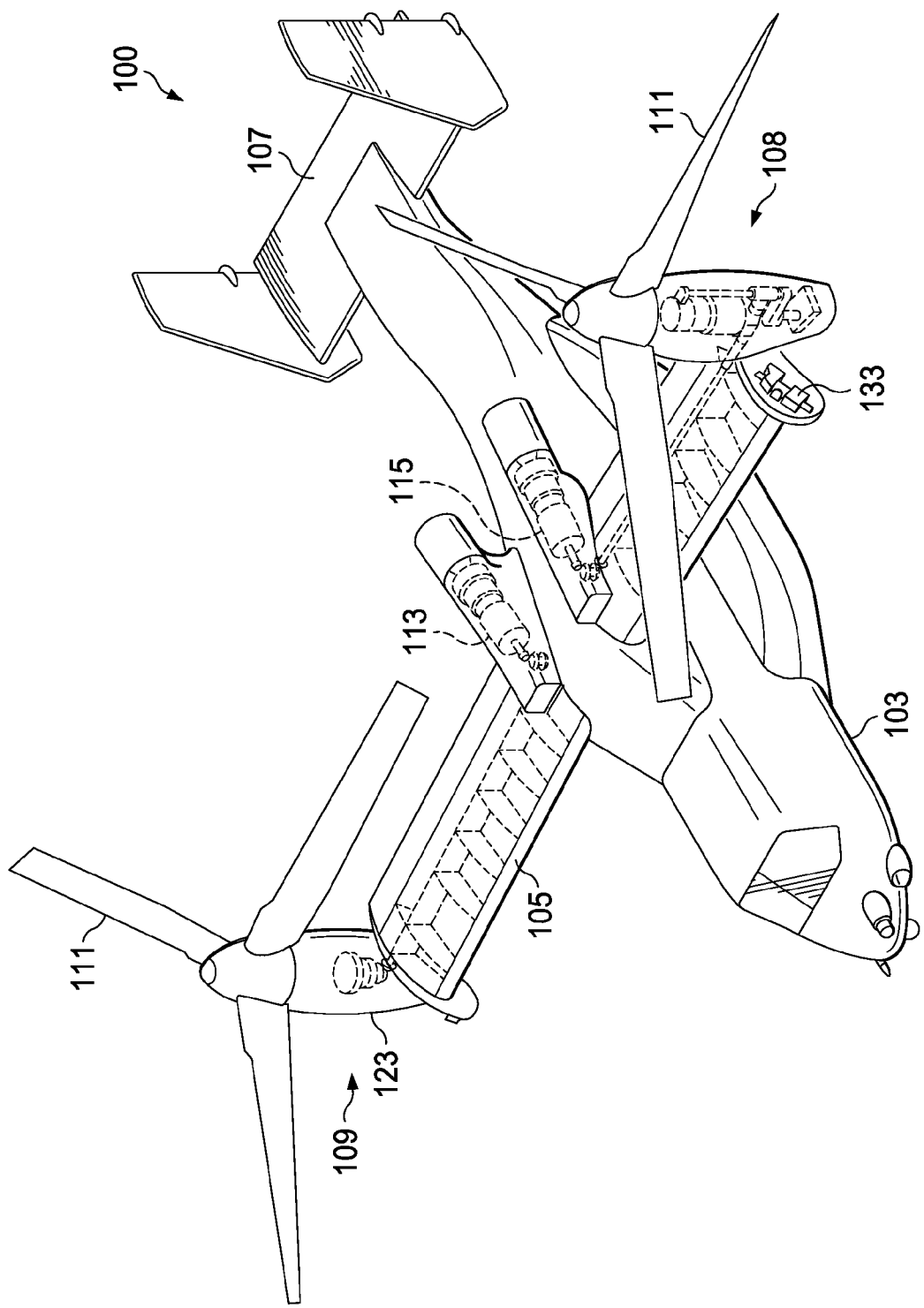
FIG. 2 is a perspective, partial cut-away view of a tilt rotor aircraft in a helicopter mode according to an embodiment.

The aircraft 100 and rotor system 108 are illustrated in FIG. 1 in an airplane mode, and in a helicopter mode in FIG. 2. The rotor system 108 is rotatable between the airplane mode, in which rotor system 108 is positioned approximately horizontal (as shown in FIG. 1), and a helicopter mode (as shown in FIG. 2), in which rotor system 108 is positioned approximately vertical. In the airplane mode, vertical lift is primarily supplied by the airfoil profile of wing member 105, while the rotor blades in each rotor system 108 provide forward thrust. The rotor systems 108, 109 are configured to selectively provide control inputs to the rotor blades while in airplane mode. For example, the rotor systems 108, 109 can provide yaw control by selectively adjusting the pitch of rotor blades 110 differently from rotor blades 111. It should be appreciated that other aerodynamic control features on wing member 105 may provide different and redundant control features for the aircraft 100. In the helicopter mode, the rotor systems 108, 109 are positioned approximately vertical, and vertical lift is primarily supplied by the thrust of the rotor blades in each rotor system 108, 109. The rotor assemblies 108, 109 are configured to selectively control the pitch of rotor blades 110, 111, collectively and cyclically, in order to provide yaw, pitch, and roll control to the aircraft 100 in helicopter mode. It should be appreciated that the tilt rotor aircraft 100 may be operated such that rotor systems 108, 109 are selectively positioned at any position between the airplane mode and helicopter mode, which can be referred to as a conversion mode.

Figure 3A:
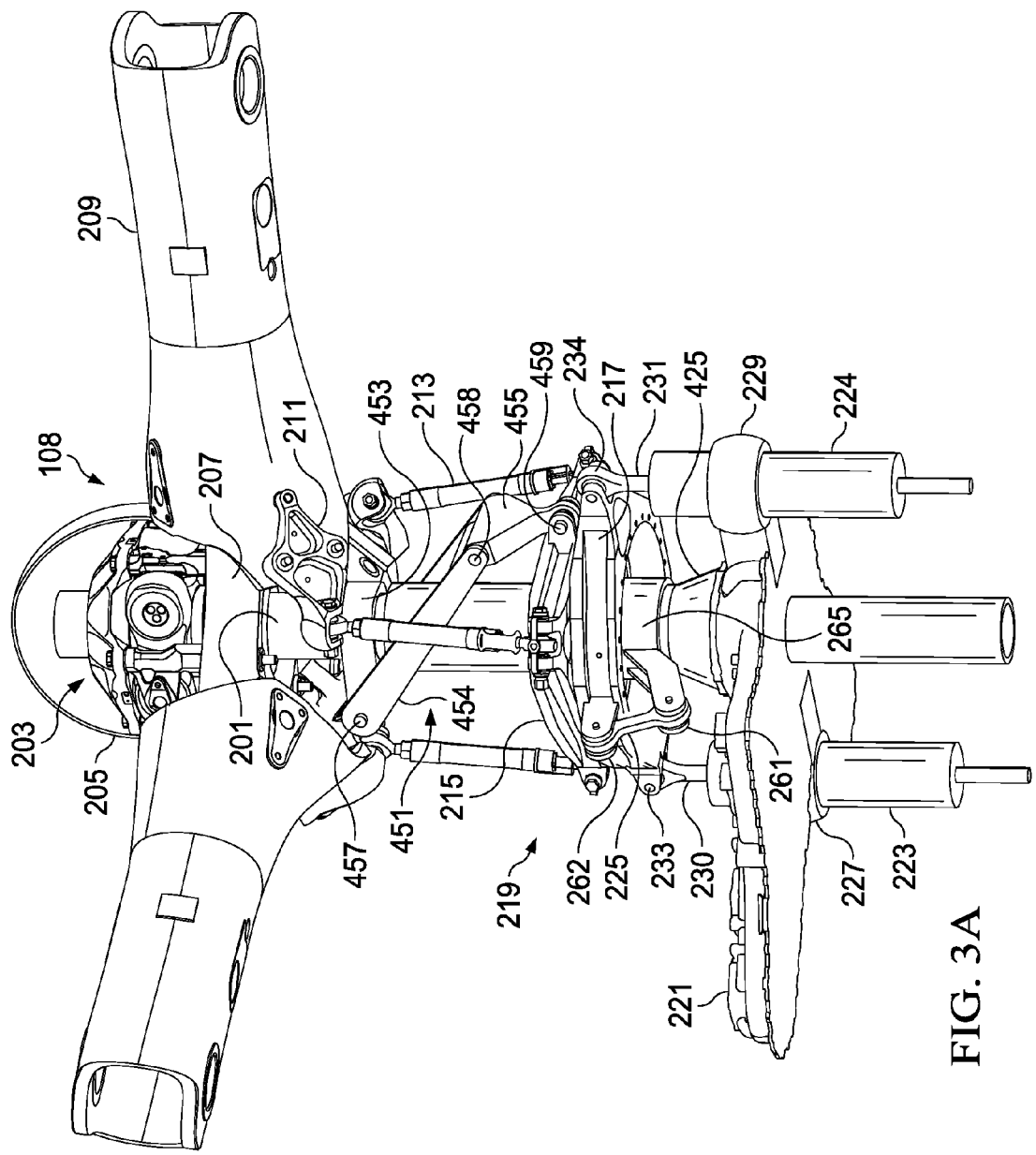
FIG. 3A is a perspective view of a rotor system according to an embodiment.
Figure 3B:
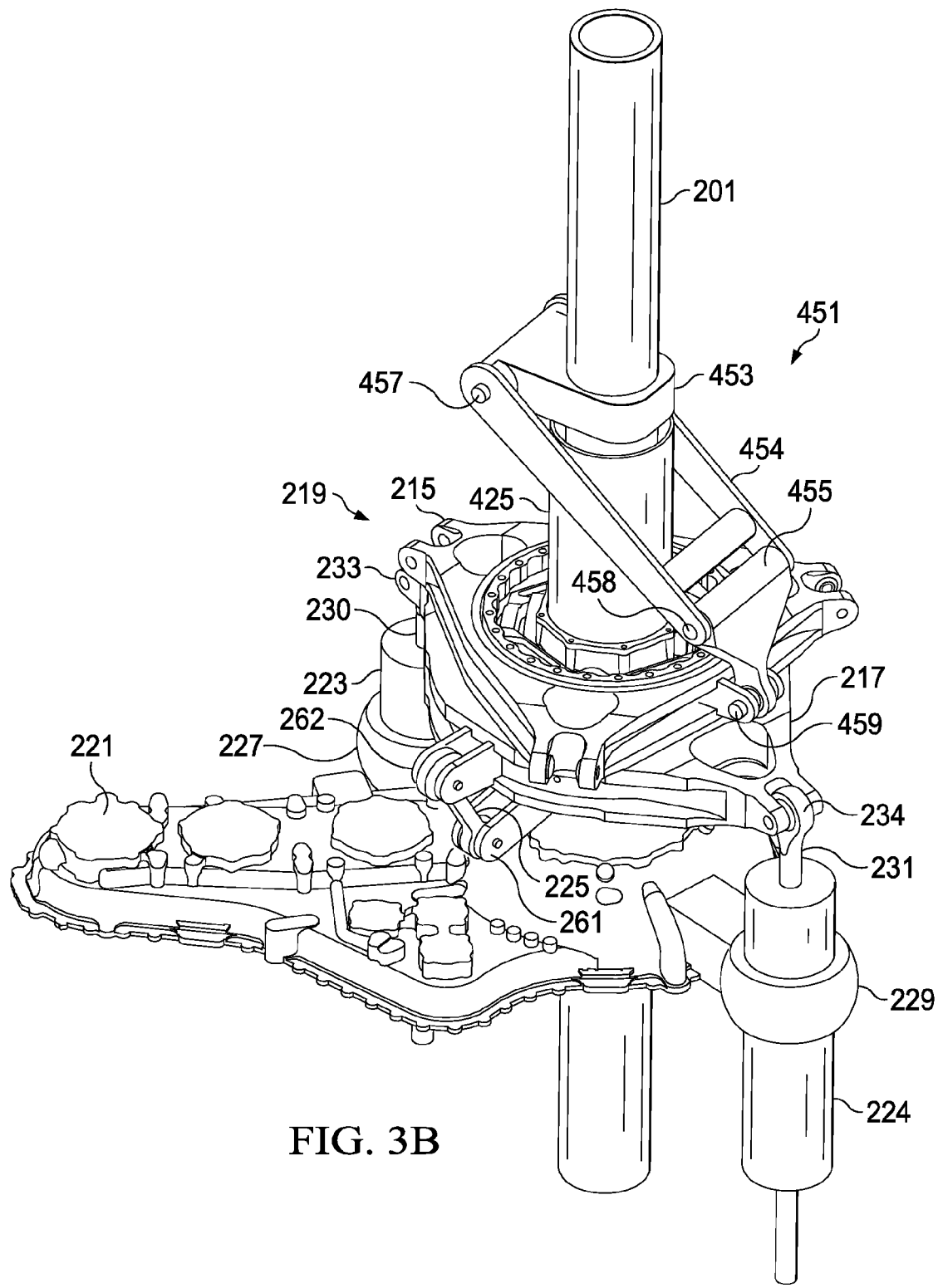
FIG. 3B is another perspective view of a rotor system according to an embodiment.

FIGS. 3A and 3B illustrate a rotor system 108 for use with an aircraft. The rotor system 108 comprises a rotor mast 201 coupled to a rotor hub 203, which in turn is coupled to the plurality of rotor blades. The rotor mast 201 and rotor hub 203 may form an internal rotor structure that may be located within an aerodynamic spinner fairing 205.

The rotor hub 203 optionally includes one or more yokes 207 used to couple the rotor blades to the rotor hub 203 while allowing the blades to flap up and down relative to the rotor mast 201. The rotor hub 203 may also include a rotor grip 209 for each rotor blade that is attached to the rotor hub 203. The rotor grip 209 includes an outboard end that attaches to a blade, an inboard end that attaches to a pitch horn 211. A pitch linkage 213 couples the pitch horn 211 to a rotatable ring 215 of a swashplate assembly 219. The swashplate assembly 219 generally comprises a non-rotating ring 217 engaged with the rotatable ring 215, where the non-rotating ring 217 is configured to engage and guide the rotatable ring 215. The rotatable ring 215 is torsionally locked to and rotates with the rotor mast 201. A bearing or other friction reducing member may be disposed between the rotatable ring 215 and the non-rotating ring 217 to reduce the friction and maintain an engagement between the rotatable ring 215 and the non-rotating ring 217 during use.

As noted above, the rotatable ring 215 is torsionaly locked to the rotor mast 201. This may be accomplished using a number of configurations. In an embodiment, the rotatable ring 215 may directly engage the rotor mast and the non-rotating ring 217 may be retained in position using an engagement with the two main actuators 223, 224, as described in more detail below. For example, the rotatable ring 215 may be attached to a tiltable mechanism such as a gimbal which is locked to and rotates with the rotor mast 201.

In an embodiment, the rotatable ring 215 may be coupled to the rotor mast 201 through a separate structure, such as the rotating link 451. In this embodiment, a rotating link 451 may be used to couple the rotatable ring 215 to the rotor mast 201 to allow the rotatable ring 215 to rotate in unison with the rotor mast 201 and the plurality of rotor blades. The rotating link 451 may generally comprise any mechanism configured to mechanically link the rotation of the rotatable ring 215 with the rotor mast 201. As shown in the embodiment of FIGS. 3A and 3B, the rotating link 451 may comprise an upper coupling 453 that is fixedly engaged with rotor mast 201. The upper coupling 453 may be disposed above the top of a sleeve 425 and below the rotor hub 203. A first link arm 454 is rotatably coupled to the upper coupling 453 at a first hinge axis 457. The first link arm 454 is rotatably coupled to a second link arm 455 at a second hinge axis 458. The second link arm is then rotatably coupled to the rotatable ring 215 at a third hinge point 459. The rotational axes of all of the hinge axes 57,& 458, are parallel to each other, with the exception that the hinge point 459 may allow some amount of rotation of the rotatable ring 215 about a non-parallel axis. The first link arm 454 and the second link arm 455 may be constructed to resist relative rotational bending with respect to the upper coupling 453, thereby transferring the rotation force from the rotor mast 201 through the rotating link 451 to the rotatable ring 215. The hinged construction of the rotating link 451 allows the rotatable ring 215 to rise and fall relative to the upper coupling 453 while being adjustable in angle relative to the axis of the rotor mast 201.

The non-rotating ring 217 can be mounted about the rotor mast 201. A first actuator 223 and a second actuator 224 are coupled to the non-rotating ring 217 and a stationary surface such as the upper gear housing 221, which may form a portion of the prop-rotor gearbox within the rotor system 108. As used herein, the term stationary surface refers to a surface that remains stationary with respect to the rotor system 108 as opposed to rotating with the rotor mast 201 and the plurality of rotor blades 110. The first actuator 223 may be coupled to the upper gear housing 221 at a coupling 227, and the second actuator 224 is similarly coupled to another portion of the upper gear housing 221 at a coupling 229. Each actuator 223, 224 comprises an actuator link 230, 231, respectively, that is coupled to the non-rotating ring 217 and is selectively extendable to control the tilt and translation of the non-rotating ring 217. In an embodiment, the non-rotating ring 217 is held in position about the rotor mast 201 only through the connection with the actuators 223, 224 and the rotatable ring 215

In an embodiment, the sleeve 425 can be used couple the non-rotating ring 217 to a stationary surface such as the upper gear housing 221. The sleeve 425 may be coupled to the upper gear housing 221 and extend upwards towards the rotor hub 203 about the rotor mast 201. For example, the sleeve 425 may be concentrically disposed about the rotor mast 201 while being torsionally locked to the upper gear housing 221. A bearing can be used between the sleeve 425 and the non-rotating ring 217 that is configured to allow the non-rotating ring 217 to translate along the axis of the rotor mast 201 and tilt about one or more axis while being rotationally fixed relative to the rotor system 108 housing. The bearing may be located between the non-rotating ring 217 and the outer surface of the sleeve 425. For example, a trunnion mount comprising protrusions extending from the sleeve 425 and engaging recesses on the non-rotating ring 217 may be used to couple the non-rotating ring 217 to the sleeve while allowing for rotation of the non-rotating ring about an axis perpendicular to the longitudinal axis of the rotor mast 201 (e.g., to allow tilting of the non-rotating ring 217).

In the embodiment illustrated in FIGS. 3A and 3B, the non-rotating ring 217 may be coupled to the sleeve 425 through a link 225 and a component that is torsionally locked with respect to the stationary surface such as the upper gear housing 221. In an embodiment, the link 225 is coupled to the non-rotating ring 217 at a first connection point 262 and to a support 265 at a second connection point 261. The support 265 may slidingly engage the sleeve 425. The coupling between the sleeve 425 and the support 265 may allow the support 265 to translate along the longitudinal axis of the rotor mast 201 without engaging or rotating with the rotor mast 201. The coupling between the sleeve 425 and the support 265 may also react to any forces created by rotation or tilting of the non-rotating ring 217, thereby supporting the non-rotating ring 217 during use. In an embodiment, the support 265 may be torsionally locked with the sleeve 425, for example using engaging longitudinal splines on an inner surface of the support 265 and an outer surface of the sleeve 425. The first connection point 262 and/or the second connection point 261 may be configured to allow the non-rotating ring 217 to tilt about a single axis. While a single link 225 is illustrated as being coupled between the non-rotating ring 217 and the support 265, two or more links may be used to couple the non-rotating ring 217 to the support 265. For example, two links disposed at one hundred eighty degrees apart may be used to both support the non-rotating ring 217 and define the single axis of rotation or tilting of the non-rotating ring 217 in response to inputs from the acutators 223, 224.

The actuators 223, 224 may comprise any type of actuator capable of receiving an input signal and selectively extending the respective actuator link 230, 231. In an embodiment, the actuators 223, 224 may include, but are not limited to, a linear actuator, a rotary actuator, a hydraulic actuator, or the like. In an embodiment, the actuators 223, 224 may comprise redundant features in the event that a portion of the actuator 223, 224 is damaged or fails to operate as intended. For example, one or more of the actuators 223, 224 may comprise triple redundant hydraulic actuators, and one or more of the three actuation cylinders within a given actuator 223, 224 may be shielded to prevent damage from an external source. The input signal may comprise an electrical signal, a hydraulic signal, a mechanical input, or the like and may be provided by various control devices within the aircraft 100.

The non-rotating ring 217 may be configured to rotate or tilt about a single axis, which may be configured to control fore and aft movements of the aircraft when the aircraft is in the helicopter mode. The non-rotating ring 217 can be configured to tilt about a single axis using several configurations. In an embodiment, the actuators 223, 224 may be coupled to the non-rotating ring at connection points 233, 234, which may be on opposite sides of the non-rotating ring 217. For example, the connection points 233, 234 may be separated by about one hundred eighty degrees on the non-rotating ring 217. This alignment may result in limiting the tilt of the non-rotating ring to a single axis that passes through the rotor mast 201 and is perpendicular to a line passing between the two connection points 233, 234. Any selective extension of the actuator links 230, 231 results in a tilting about the single axis and/or a translational motion along the longitudinal axis of the rotor mast 201. In an embodiment, the single axis may generally be aligned parallel with either the longitudinal or lateral axis of the aircraft for helicopters and tilt rotor aircraft, although other configurations may be possible depending on the desired operational characteristics of the aircraft.

In some embodiments, a bearing between the non-rotating ring 217 and the sleeve 425 (.e.g, as part of translatable sleeve 265) may be used to limit the tilt of the non-rotating ring 217 to a single axis. Various mounting mechanisms may be used to limit the tilt of the non-rotating ring 217 to a single axis. For example, a trunnion mount comprising protrusions extending from the translatable sleeve 265 and engaging recesses on the non-rotating ring 217 may be used to limit the non-rotating ring 217 to rotation about an axis of rotation defined by the protrusions. Additionally or alternatively, one or more links (e.g., link 225) may be used to define a single axis of rotation based on the connection point 262. Various other bearings or mounting mechanisms may also be used to limit the rotation of the non-rotating ring 217 to a single tilt axis. When a bearing and/or connection point 262 is used to limit the axis of rotation of the non-rotating ring 217, the connection points 233, 234 of the actuators 223, 224 may be located on opposite sides of the axis of rotation, but not necessarily one hundred eighty degrees apart. For example, the first connection point 233 may be located on a different side of the axis of rotation from the second connection point 234 to allow for relative motion between the connection points to cause a tilting of the non-rotating ring 217. Further, the connection points 233, 234 may be located between about ninety degrees and two hundred seventy degrees apart while still providing the desired tilting and/or translation of the non-rotating ring 217.

During use, the swashplate assembly 219 is configured to selectively adjust the pitch of the rotor blades. As the rotatable ring 215 rotates with the rotor mast 201, each pitch linkage 213 is driven up and down due to the engagement of the rotatable ring 215 with the non-rotating ring 217. Accordingly, as the rotatable ring 215 rotates, it drives each pitch linkage 213, which drives each corresponding pitch horn 211 to rotate each rotor grip 209 and rotor blade. This allows the pitch of each of the blades to be controlled. For instance, each blade is able to rotate clockwise or counterclockwise about an axis of rotation that runs along the length of each blade.

The path of the rotatable ring 215 is determined by the engagement with the non-rotating ring 217. The actuators 223, 224 can be extended or refracted to tilt and/or translate the non-rotating ring 217. A tilting of the non-rotating ring 217 about a single axis can create a cyclic mode configured to differentially change the pitch of one or more rotor blades. For example, when the non-rotating ring 217 is tilted, the rotor blades may change their pitch at different angular positions about the rotor mast 201. The single axis about which the non-rotating ring 217 tilts may be configured to affect the fore and aft motion of the aircraft in flight in the helicopter mode. Similarly, the non-rotating ring 217 can be selectively translated along the longitudinal axis of the rotor mast 201 in a collective mode so as to uniformly change the pitch of the rotor blades. A change in the collective mode may affect the vertical lift in the helicopter mode and the forward thrust in the airplane mode.

Figure 4A:
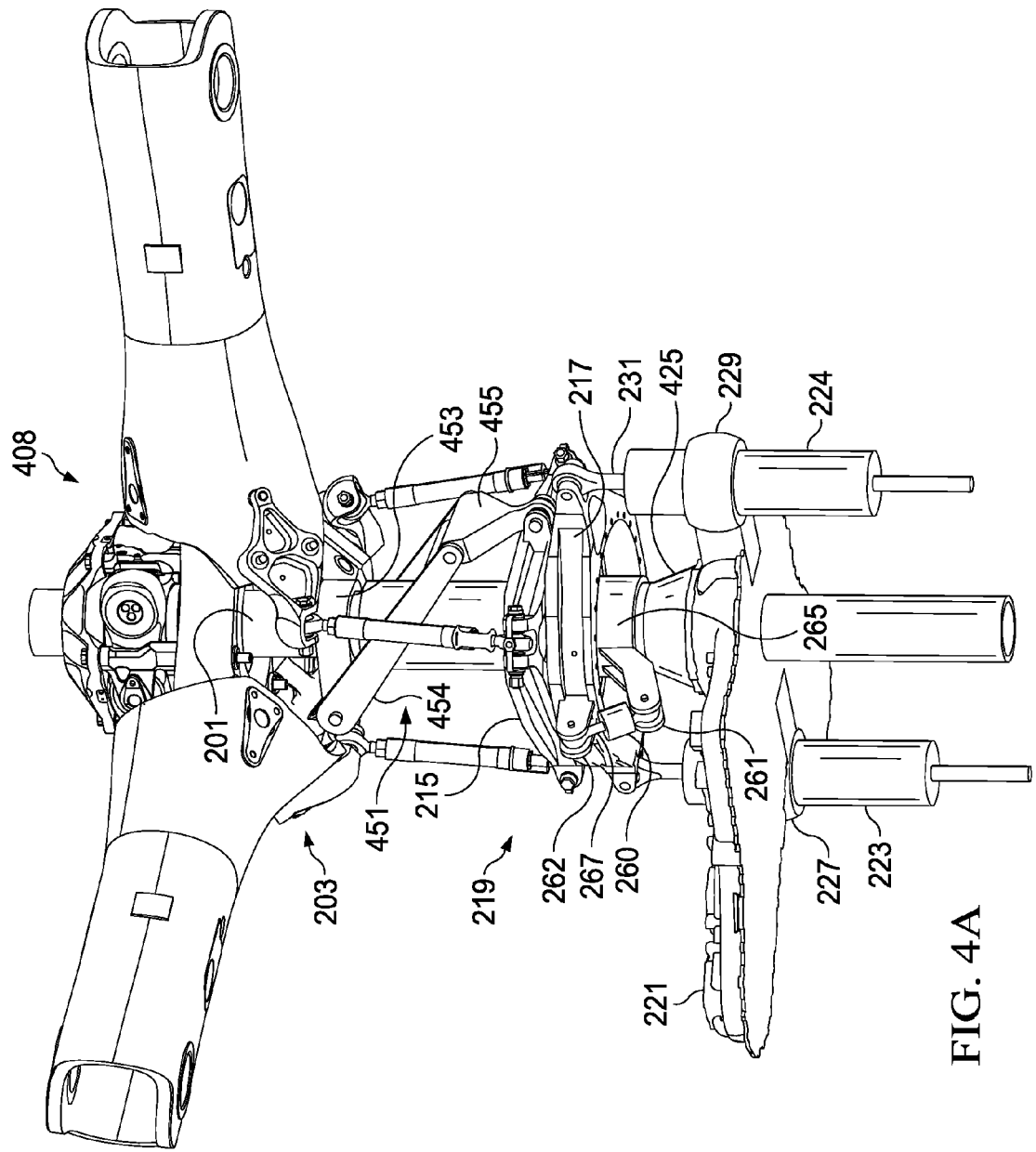
FIG. 4A is still another perspective view of a rotor system according to an embodiment.
Figure 4B:
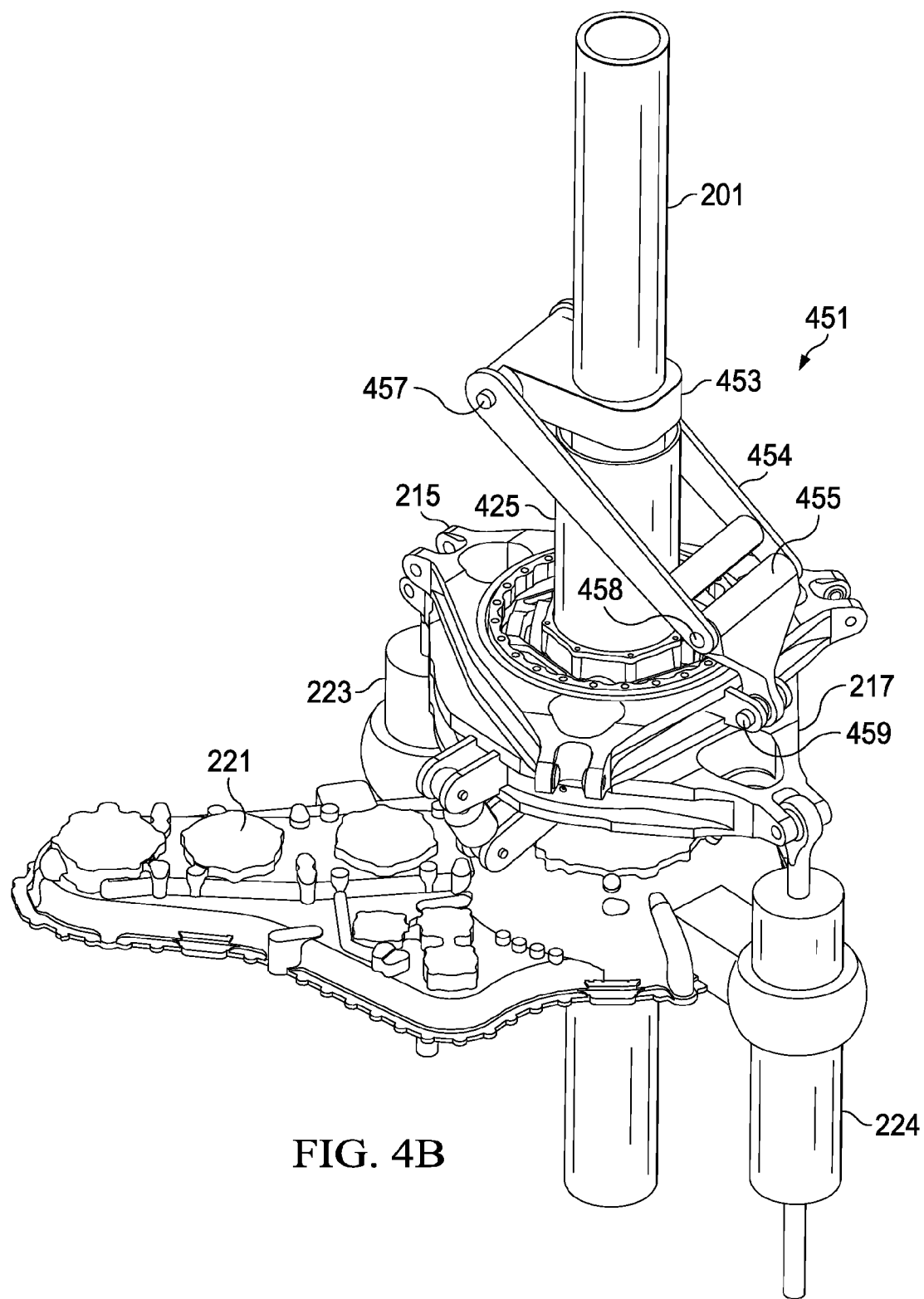
FIG. 4B is yet another perspective view of a rotor system according to an embodiment.

Another embodiment of a rotor system 408 is illustrated in FIGS. 4A and 4B. The rotor system 408 is similar to the rotor system 108 described above with respect to FIGS. 3A and 3B, and in the interest of clarity, some similar components will not be discussed. As illustrated in FIG. 4A, the rotor system 408 comprises a rotor hub 203, which can be coupled to a plurality of rotor blades. A rotatable rotor mast 201 is coupled to the rotor hub 203 and is configured to provide the force for rotating the rotor hub 203 and associated rotor blades. The swashplate assembly 219 comprises the non-rotating ring 217 engaged with the rotatable ring 215, where the non-rotating ring 217 is configured to engage and guide the rotatable ring 215. A first actuator 223 and a second actuator 224 are coupled to the non-rotating ring 217 and a stationary surface such as the upper gear housing 221 using couplings 227, 229. Each actuator 223, 224 comprises an actuator link 230, 231, respectively, that is coupled to the non-rotating ring 217 and is selectively extendable to control the tilt and translation of the non-rotating ring 217. The actuators 223, 224 may comprise any of the types of actuators described herein.

As shown in FIG. 4A, a trim actuator 260 having a trim link 267 may be provided in place on the link 225, and the trim actuator 260 can be mechanically coupled to the non-rotating ring 217 and a component that is rotationally locked with respect to the stationary surface such as the upper gear housing 221. In an embodiment, the trim actuator 260 is coupled to the non-rotating ring 217 at a first connection point 262 and to a translatable sleeve 265 at a second connection point 261. The translatable sleeve 265 may be slidingly coupled to the sleeve 425, which may in turn be coupled to a stationary surface such as the upper gear housing 221. The coupling between the sleeve 425 and the translatable sleeve 265 may react to any forces created by the extension or refraction of the trim link 267. In an embodiment, the translatable sleeve 265 may be torsionally locked with the sleeve 425, for example using engaging longitudinal splines on an inner surface of the translatable sleeve 265 and an outer surface of the sleeve 425. When the sleeve 425 is present, the rotatable ring 215 may not be able to engage the rotor mast 201. In this embodiment, the rotating link 451 as described with respect to FIGS. 3A and 3B may be used to couple the rotatable ring 215 to the rotor mast 201 to allow the rotatable ring to rotate in unison with the rotor mast 201 and the plurality of rotor blades.

Actuation of the trim actuator 260 may result in extension or retraction of the trim link 267. The resulting movement of the trim link 267 can result in selective rotation of the non-rotating ring 217 about an axis that is not aligned with the axis of rotation generated by actuation of one or more of the actuators 223, 224. The axis of rotation controlled by the trim actuator 260 may generally be perpendicular to the axis of rotation controlled by the actuators 223, 224. In some embodiments, the axis of rotation controlled by the trim actuator 260 may be disposed at a non-perpendicular angle with respect to the axis of rotation controlled by the actuators 223, 224 due, for example, to spacing considerations within the rotor system 408. In these embodiments, the control system may be configured to actuate the trim actuator 260 in concert with one or more of the actuators 223, 224 to control the orientation of the non-rotating ring 217.

To effect the rotation of the non-rotating ring 217 about a different axis than that controlled by the actuators 223, 224, the trim actuator 260 may be coupled to the non-rotating ring 217 at a point located between the connection points 233, 234. In an embodiment, the trim actuator 260 may be coupled to the non-rotating ring 217 at a midpoint between the connection points 233, 234. For example, the connection points 233, 234 may be located about 180 degrees apart, and the connection point 262 may be located about ninety degrees from each connection point 233, 234. In some embodiments, the separation between the connection point 262 for the trim actuator 260 and one or more of the connection points 233, 234 may be between about one hundred thirty degrees and about twenty degrees.

In general, the trim actuator 260 may be configured to provide relatively small inputs in tilting the stationary ring 217 when compared to the movements generated by the actuators 223, 224. For example, the first actuator 223 and the second actuator 224 can be configured to tilt the non-rotating ring 217 through a first angle about the first axis, and the trim actuator 260 can be configured to tilt the non-rotating ring 217 through a second angle about the second axis. The first angle may be larger than the second angle, and in an embodiment, a ratio of the first angle to the second angle may be in the range of about 1000:1 to about 2:1, or in the range of about 100:1 to about 5:1. Such relatively small adjustments may be used to correct for minor differences in the angle of the rotor blades to allow for a greater degree of control of the aircraft during flight. Further, the configuration of the trim actuator 260 may only be capable of tilting the non-rotating ring 217 and not translating the non-rotating ring 217 along the longitudinal axis of the rotor mast 201 due to its sliding engagement with the stationary surface.

During use, the swashplate assembly 219 is configured to selectively adjust the pitch of the rotor blades 110 based on the engagement of the rotatable ring 215 with the non-rotating ring 217, as described in more detail above. The actuators 223, 224 can be extended or contracted to tilt the non-rotating ring 217 about a first axis as well as translate the non-rotating ring 217 along the longitudinal axis of the rotor mast 201. The trim actuator 260 can be extended or contracted to tilt the non-rotating ring 217 about a second axis. The tilting of the non-rotating ring 217 about the first and second axis may have a combined effect of allowing for the full articulation of the non-rotating ring 217 about the rotor mast 201 within the rotational limits of the individual actuators.

In the helicopter mode, the tilting of the non-rotating ring 217 about the first and second axis may have a combined effect of allowing for the creation of a cyclic mode configured to propel the aircraft in more than just a fore and aft direction. In some embodiments, the trim actuator 260 may be used to correct for minor misalignments of the rotor blades 110 based on the main actuators 223, 224 to provide a cyclic mode configured to propel the aircraft in the fore and aft direction. For example, the trim actuator 260 may be used to cancel any lateral forces created by one rotor system 408 on one side of an aircraft that are not similarly created and balanced by a rotor system on an opposite side of the fuselage of the aircraft.

Similarly, the non-rotating ring 217 can be selectively translated along the longitudinal axis of the rotor mast 201 in a collective mode so as to uniformly change the pitch of the rotor blades 110. In the airplane mode, the rotor system is generally expected to create only a forward thrust. In this mode, the trim actuator 260 may be used along with the main actuators 223, 224 to selectively generate or cancel any lateral or vertical force created by the rotor system 408.

As described above, the use of the swashplate assembly 219 having only two main actuators 223, 224 with a rotor system may allow for operation of the aircraft while allowing for more room within the rotor system. An optional trim actuator 260 can be used that is smaller than the main actuators 223, 224, thus allowing for some amount of trim actuation while taking up only a minor amount of space within the rotor system. The swashplate assembly 219 as described herein may be used with a variety of tilt rotor aircraft as well as fixed rotor aircraft.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Unless otherwise stated, the term "about" shall mean plus or minus 10 percent of the subsequent value. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present invention.

What is claimed:

1. A rotor system for rotor aircraft, the rotor system comprising:
   a rotor hub comprising a plurality of rotor blades;
   a rotatable rotor mast coupled to the rotor hub;
   a swashplate assembly comprising a non-rotating ring engaged with a rotatable ring, wherein the rotatable ring is configured to rotate with the rotor mast, and wherein the non-rotating ring is configured to engage and guide the rotatable ring;
   a plurality of pitch links mechanically coupling the rotatable ring to the plurality of rotor blades, wherein the pitch links are configured to control pitch angle of each of the rotor blades; and
   a swashplate actuator system comprising a first actuator and a second actuator, wherein the first and the second actuators are positioned about a vertical axis of the rotatable rotor mast, wherein the first actuator and the second actuator are mechanically coupled to a stationary surface and the non-rotating ring, the first actuator and the second actuator are configured to tilt the non-rotating ring about a single axis of rotation; and
   a trim actuator mechanically coupled to the non-rotating ring and a translatable sleeve positioned about the rotatable rotor mast, the trim actuator is configured to tilt the non-rotating ring about a second axis of rotation different from the single axis of rotation.

2. The rotor system of claim 1, wherein the stationary surface is a gear housing within the rotor system.

3. The rotor system of claim 1, the non-rotating ring is only coupled to the first actuator, the second actuator, and the rotatable ring.

4. The rotor system of claim 1, further comprising:
   a sleeve disposed about the rotatable rotor mast and coupled to the stationary surface; and
   a bearing coupled to the sleeve and the non-rotating ring, wherein the bearing is configured to limit the tilt of the non-rotating ring to a single axis.

5. The rotor system of claim 1, wherein at least one of the first actuator or the second actuator comprises a linear actuator, a rotary actuator, or a hydraulic actuator.

6. The rotor system of claim 1, wherein the first actuator and the second actuator are triple-redundant actuators.

7. The rotor system of claim 1, wherein the first actuator and the second actuator are further configured to translate the non-rotating ring along a longitudinal axis of the rotatable rotor mast at a fixed angle.

8. The rotor system of claim 1, wherein the first actuator is coupled to the non-rotating ring at a first connection point of the non-rotating ring, and the second actuator is coupled to the non-rotating ring at a second connection point of the non-rotating ring opposite the first connection point.

9. The rotor system of claim 8, wherein the trim actuator is coupled to the non-rotating ring at a point on the non-rotating ring different from the first connection point and the second connection point.

10. The rotor system of claim 9, wherein the point on the non-rotating ring where the trim actuator is coupled to the non-rotating ring is on a periphery of the non-rotating ring midway between the first connection point and the second connection point.

11. A rotor system for rotor aircraft, the rotor system comprising:
    a rotor hub comprising a plurality of rotor blades;
    a rotatable rotor mast coupled to the rotor hub;
    a swashplate assembly comprising a non-rotating ring engaged with a rotatable ring,
    wherein the non-rotating ring is configured to engage and guide the rotatable ring;
    a plurality of pitch links mechanically coupling the rotatable ring to the plurality of rotor blades; and
    a swashplate actuator system comprising:
       a first actuator and a second actuator, wherein the first actuator and the second actuator are mechanically coupled to a housing and the non-rotating ring, wherein the first actuator is coupled to the non-rotating ring at a first connection point of the non-rotating ring, and the second actuator is coupled to the non-rotating ring at a second connection point of the non-rotating ring opposite the first connection point; and
       a trim actuator, wherein the trim actuator is mechanically coupled to the non-rotating ring and the housing, wherein the trim actuator is coupled to the non-rotating ring at a point on the non-rotating ring different from the first connection point and the second connection point.

12. The rotor system of claim 11, wherein the first actuator and the second actuator are configured to tilt the non-rotating ring through a first angle, wherein the trim actuator is configured to tilt the non-rotating ring through a second angle, and wherein the ratio of the first angle to the second angle is in the range of 1000:1 to about 2:1.

13. The rotor system of claim 11, wherein the trim actuator is mechanically coupled to the housing through a sleeve disposed about vertical axis of the rotatable rotor mast, wherein the sleeve is fixedly coupled to the housing.

14. The rotor system of claim 11, wherein the first actuator and the second actuator are positioned about the rotatable rotor mast and configured to tilt the non-rotating ring about a first axis of rotation, and wherein the trim actuator is configured to tilt the non-rotating ring about a second axis of rotation, and wherein the first axis of rotation and the second axis of rotation do not align.

15. The rotor system of claim 11, wherein the rotor system is configured to selectively rotate between a helicopter mode in a vertical position and an airplane mode in a horizontal position, wherein the first actuator and the second actuator are configured to provide a cyclic input to the rotor blades to propel the rotor aircraft fore and aft in the helicopter mode, and wherein the first actuator and the second actuator are configured to provide a collective input to the rotor blades to propel the rotor aircraft in the airplane mode.

16. The rotor system of claim 11, wherein the first actuator and the second actuator are triple-redundant actuators, and wherein the trim actuator is not a triple-redundant actuator.

17. The rotor system of claim 11, wherein the rotatable ring is rotationally coupled to the rotatable rotor mast by a rotating link.

18. The rotor system of claim 14, wherein the second axis of rotation is perpendicular to the first axis of rotation.

19. The rotor system of claim 18, wherein the trim actuator is not configured to translate the non-rotating ring along a longitudinal axis of the rotatable rotor mast.

20. A swashplate assembly for use with a rotor aircraft, the swashplate assembly comprising:
a non-rotating ring engaged with a rotatable ring, wherein the rotatable ring is configured to rotate with a rotor mast, and wherein the non-rotating ring is configured to engage and guide the rotatable ring; and
a swashplate actuator system comprising:
a first actuator and a second actuator engaged with the non-rotating ring, wherein the first actuator and the second actuator are configured to tilt the non-rotating ring about a single axis of rotation, and
wherein the first actuator and the second actuator are further configured to translate the non-rotating ring along a longitudinal axis of the rotor mast at a fixed angle; and
a trim actuator mechanically coupled to the non-rotating ring and a stationary surface, wherein the trim actuator is configured to tilt the non-rotating ring about a second axis of rotation different from the single axis of rotation.

21. The swashplate assembly of claim 20, wherein the trim actuator cannot translate the non-rotating ring along the longitudinal axis of the rotatable rotor mast other than tilting.

22. The swashplate assembly of claim 20, wherein the trim actuator is configured to tilt the non-rotating ring by a first angle, wherein the first actuator and the second actuator are configured to tilt the non-rotating ring by a second angle, and wherein the ratio of the first angle to the second angle is in the range of 1:100 to 1:2.

* * * * *